March 30, 1926. 1,579,045
T. WESTLEY
ROAD VEHICLE WHEEL HAVING DETACHABLE SIDE RING
Filed May 12, 1924 3 Sheets-Sheet 1
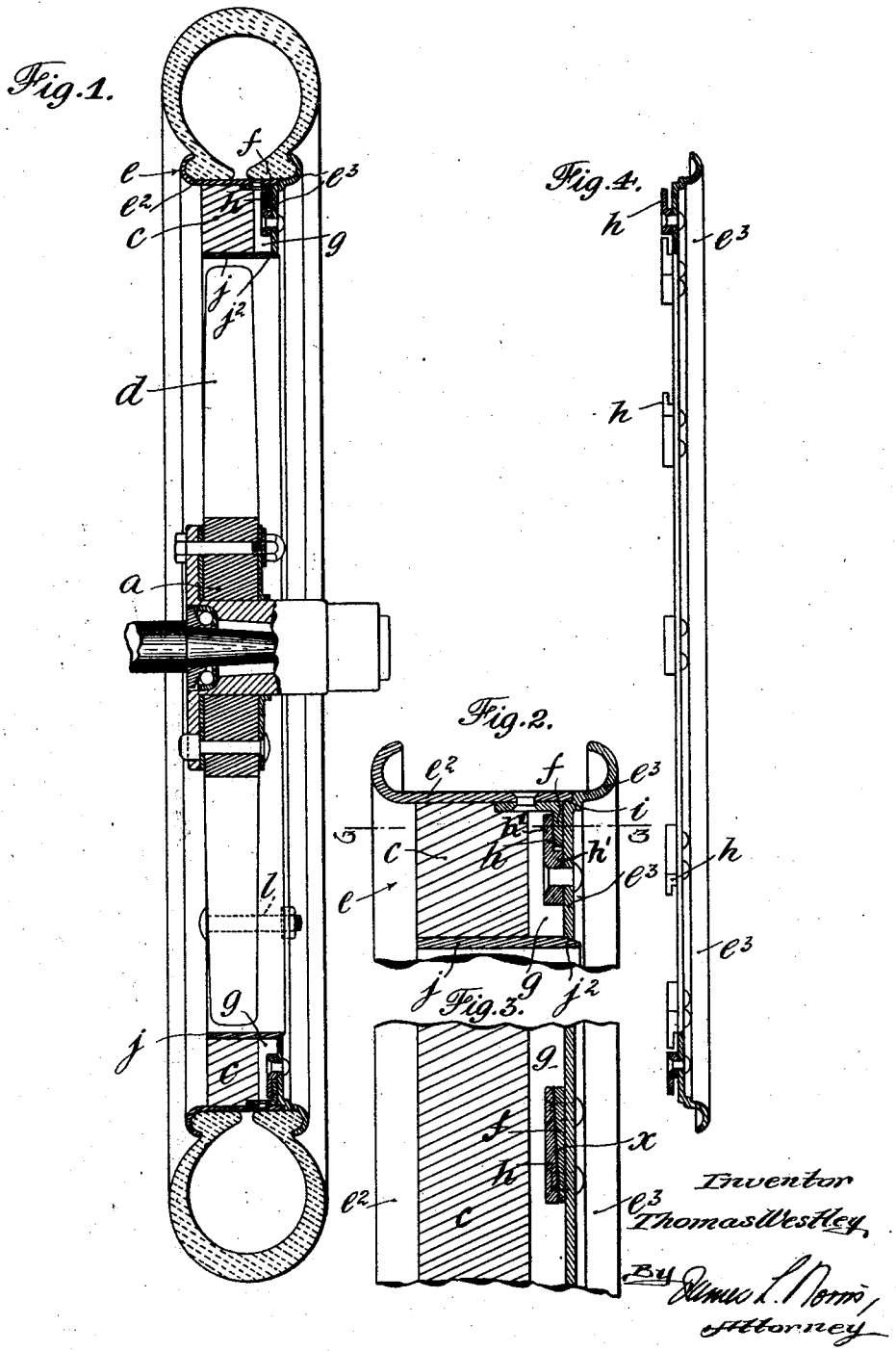

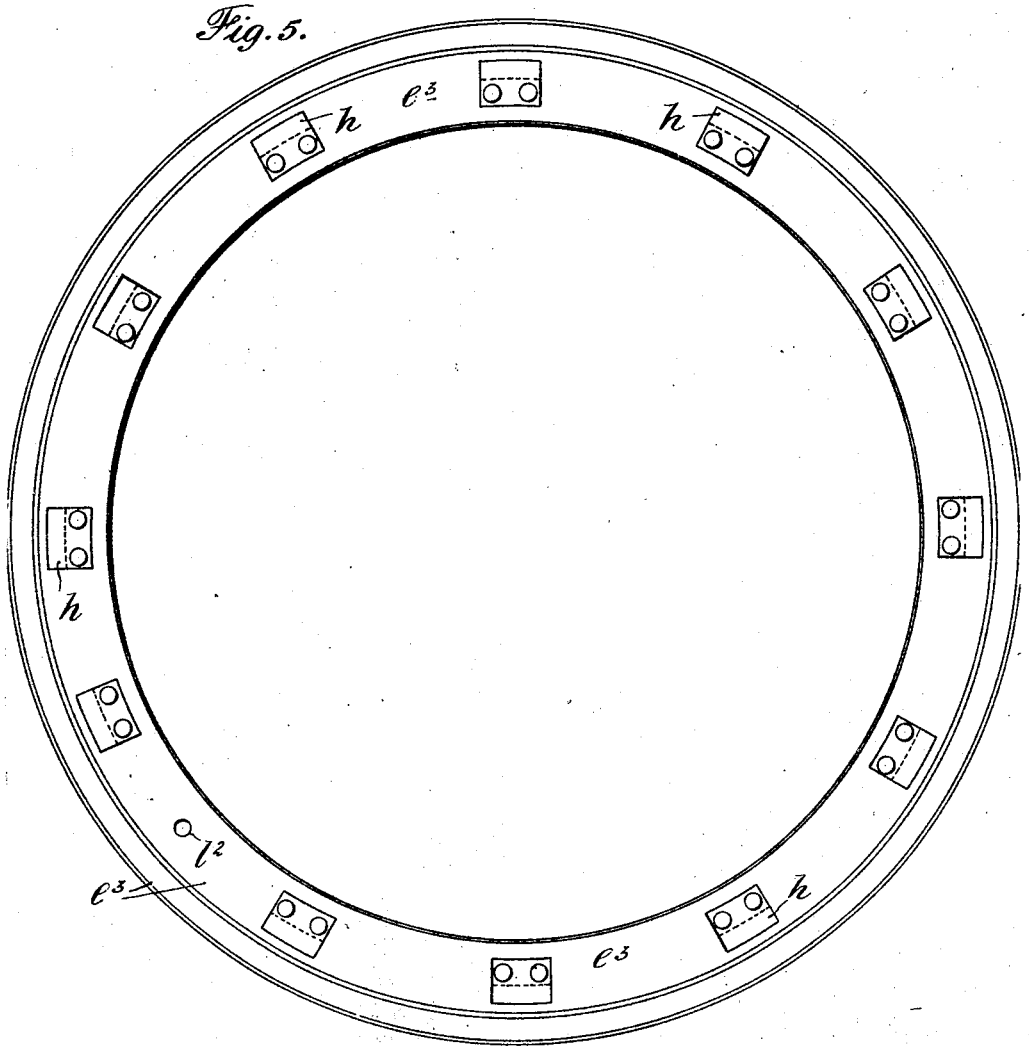

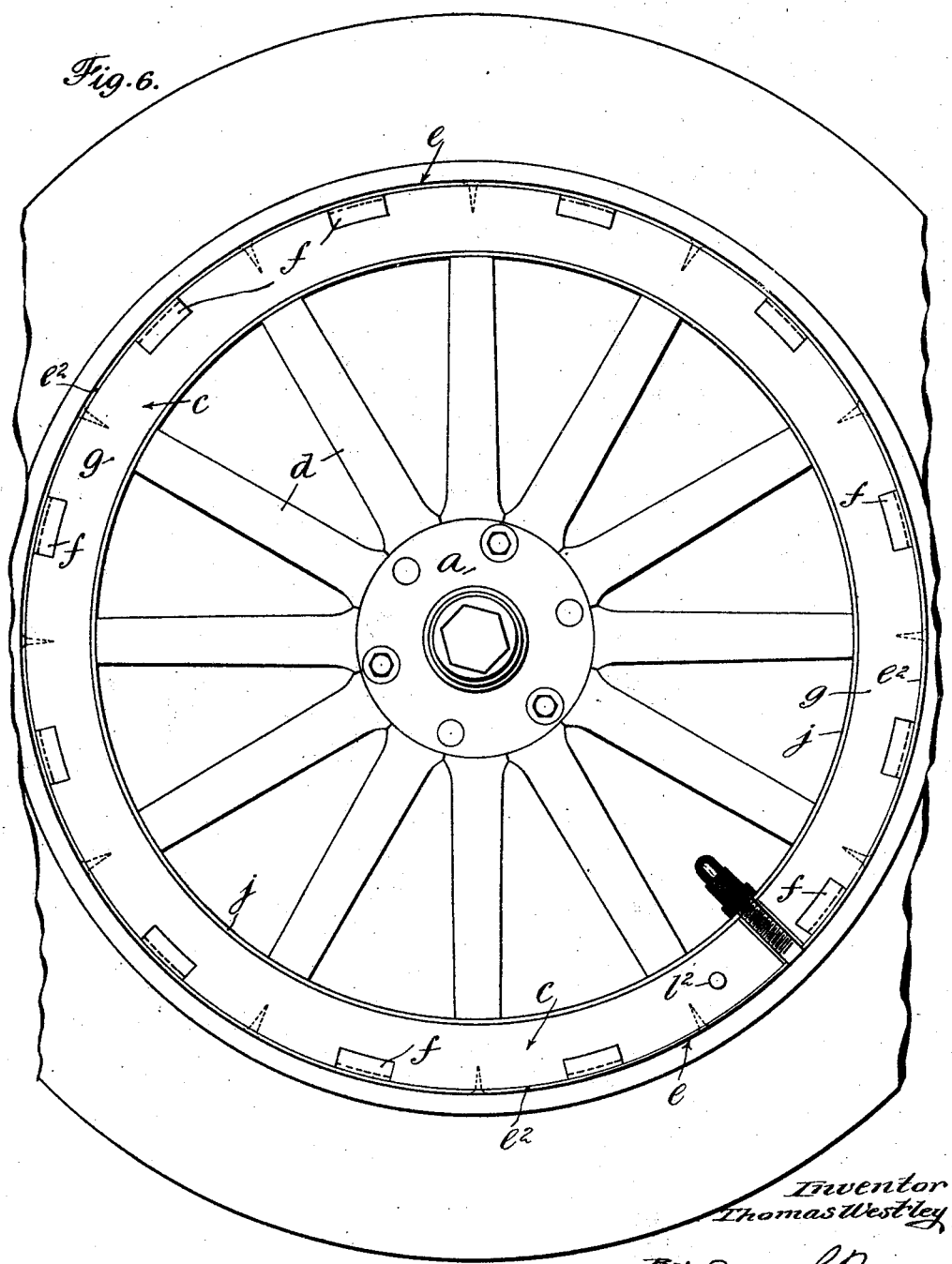

Patented Mar. 30, 1926.

1,579,045

UNITED STATES PATENT OFFICE.

THOMAS WESTLEY, OF DUDLEY, ENGLAND.

ROAD-VEHICLE WHEEL HAVING DETACHABLE SIDE RING.

Application filed May 12, 1924. Serial No. 712,813.

*To all whom it may concern:*

Be it known that I, THOMAS WESTLEY, subject of the King of Great Britain, residing at Dudley Brass and Bronze Foundry, Shaw Road, Dudley, Staffordshire, England, have invented certain new and useful Improvements in Road-Vehicle Wheels Having Detachable Side Rings, of which the following is a specification.

The invention relates to a road vehicle wheel of the kind having a detachable side ring carrying one of the rim flanges and serving the purpose of easy detachment of the tire from the rim.

In this kind of wheel the invention provides a particular combination of parts. A rim member carrying one rim flange is fixed over a felly to which is also fixed an inner metal ring. A circumferential channel is formed in one side of the felly between the rim member and the inner ring. A number of circumferentially arranged lock devices are provided a distance apart on the rim member to project into the channel. A detachable side ring formed with the other rim flange and provided on its inner side with co-acting catches or keepers to receive the lock devices on the rim member, serves to close the channel and by partial reverse rotating movements thereof the lock devices and catches or keepers are caused to engage or become disengaged. The side ring member abuts against the rim member and also against the inner metal ring, so that this side ring member has transverse abutments against both the rim member and the inner ring. A single fastening means such as a bolt or analogous device is provided to fix the side ring against rotation when the lock devices and catches or keepers are in engagement.

The invention is represented by the accompanying drawings.

Fig. 1 is an axial section through a wheel.

Fig. 2 is an enlarged section of a portion of Fig. 1.

Fig. 3 is a horizontal section on the line 3—3, Fig. 2.

Fig. 4 shows a section of the side ring of Fig. 1 by itself.

Fig. 5 shows an inner face view of the ring of Fig. 4.

Fig. 6 shows an outer side view of Fig. 1 but with the ring of Fig. 4 removed.

The fastening devices shown in the drawings are flat plate-like pieces a number of which are fixed to the side ring and a corresponding number to the side of the felly.

The wheel is built up substantially in the ordinary way, that is to say of hub $a$, felly $c$, and intervening spokes $d$, its rim $e$ being as usual formed of two members $e^2$, $e^3$, the one member $e^2$ rigidly seating itself over the felly $c$ and carrying the one rim flange to suit the beaded edge of the tire cover, and the other member $e^3$ being the detachable side ring carrying the other rim flange.

The rim member $e^2$ has rigidly attached to it a plurality of lock plates $f$ spaced a distance apart circumferentially and positioned within a channel or cut-away part $g$ of the felly side and projecting from the rim radially towards the centre of the wheel, these lock plates being fixed to this rim member either by riveting, as shown, or by brazing or other means, and all being circumferentially in line.

The side ring member $e^3$ of the rim has rigidly attached to its inner face a corresponding number of plate-like catches or keepers $h$ having lower attaching bosses $h'$ and upper reduced members $h^2$ which stand away from the inner side of the ring member $e^3$ to form spaces open at the ends and outer edges of said members $h^2$, to receive the lock plates $f$ and arranged a distance apart circumferentially and adapted when the ring member $e^3$ is applied to the side of the felly to shift uniformly with the said ring member to receive the lock plates $f$ from a partial rotation of the ring about the felly, the engagement of these catches or keepers and lock plates clamping the ring to the felly side in manner represented by Figs. 1, 2 and 3. Figure 3 shows at $x$ that the engaging faces of the catches or keepers and lock plates may be inclined if desired so as to pull up tightly.

The application of the lock plates $f$ and catches $h$ respectively strengthen the rim member $e^2$ and ring member $e^3$ internally, and when said devices engage there is a comparatively large area of contact between the temporary securing means thus provided operating to resist displacement and deformation.

The side ring $e^3$ when applied closes the cut-away part $g$ of the felly side and conceals the plate-like pieces, and protects the engagement thereof against weather so that the parts thus enclosed are not liable to become rusted up.

Between the side ring member $e^3$ and the rim member $e^2$ there is an annular shoulder or annular boss engagement represented at $i$, so that the side ring member $e^3$ supports the rim member $e^2$ on the particular side of the wheel. Further an inner metal ring $j$ is fixed to the inner diameter of the felly for the side ring $e^3$ to abut against transversely of the wheel as shown at $j^2$ to give further side support to the side ring member and to exclude wet.

The side ring member is applied to the felly in such manner as to dispose the catches or keepers $h$ between the lock plates $f$, and by giving the ring member a partial rotary movement brings said catches or keepers into engagement with the lock plates.

After the lock plates and catches or keepers $f$ and $h$ have been made to engage by the partial rotation of the side ring member $e^3$, and securely fasten the members $e^2$ and $e^3$ to each other, a bolt $l$ is passed transversely through a hole $l^2$ in the felly and through an opposite hole in the side ring member $e^3$ to prevent movement of the side ring member in any direction until said bolt is again removed, so that the one bolt only is used to hold all of the fastening devices in locking engagement, and removal of said bolts permits movement of the said ring member $e^3$ to effect detachment of said latter member for disengagement of the tire from the member $e^2$.

The lock plates $f$ are angular in form, the depending or radial member projecting inwardly towards the center of the wheel serving as the direct locking means with relation to the catches or keepers $h$, and the upper remaining flanged portions of these lock plates are secured against the underside of the member $e^2$, as clearly shown by Figs. 1 and 2. Owing to the formation of the channel $g$ in one side of the felly $c$, the locking plates $f$ and the catches or keepers $h$ are fully enclosed and hidden from exterior view when the ring or ring member $e^3$ is applied and locked, as hereinbefore specified. The metal ring $j$ secured to the inner edge of the felly $c$, by its projection for edge contact with the side ring member $e^3$, also provides a metallic base closing means for the channel $g$ and contributes to the sealing of the said channel and protection of the coacting fastening means between the rim member $e^2$ and the ring member $e^3$.

Having now described my invention what I claim and desire to secure by Letters Patent is:—

A vehicle wheel comprising a felly with a chamber formed in one side thereof, a metal ring fixed to the inner side of the felly and projecting outwardly to form a base closure for the chamber, a rim member fixed over the felly and carrying one rim flange, a plurality of circumferentially arranged locking plates spaced apart on the rim member and projecting inwardly towards the center of the wheel into the chamber, a detachable side ring formed with the remaining rim flange to coact in opposition to the rim flange of the said rim member, keepers secured to the ring in regular spaced relation and provided with outer reduced portions standing away from the ring to form seats for the lock plates, the lock plates being movable into and outwardly from the seats provided therefor in the keepers, the inner opposing surfaces of the keepers and lock plates being beveled to set up a wedging action between these devices when in engagement, the engagement of the lock plates with the keepers being effected by a partial rotation of the detachable ring, the keepers projecting into the channel of the rim member and both the keepers and lock plates being enclosed within said channel and shielded from weather wear and deterioration, the detachable ring when applied abutting transversely against the edge of the ring secured to the inner portion of the felly, and a single securing device for fixing the side ring to the felly to prevent displacement of the latter.

In testimony whereof I have hereunto set my hand.

THOMAS WESTLEY.